US010044625B2

United States Patent
McGhee et al.

(10) Patent No.: US 10,044,625 B2
(45) Date of Patent: Aug. 7, 2018

(54) HASH LEVEL LOAD BALANCING FOR DEDUPLICATION OF NETWORK PACKETS

(71) Applicant: Keysight Technologies Singapore (Holdings) Pte. Ltd., Singapore (SG)

(72) Inventors: David W. McGhee, Austin, TX (US); Stefan Johansson, Round Rock, TX (US)

(73) Assignee: Keysight Technologies Singapore (Holdings) Pte Ltd, Singapore (SG)

( * ) Notice: Subject to any disclaimer, the term of this patent is extended or adjusted under 35 U.S.C. 154(b) by 796 days.

(21) Appl. No.: 14/552,691

(22) Filed: Nov. 25, 2014

(65) Prior Publication Data

US 2016/0149820 A1    May 26, 2016

(51) Int. Cl.
*H04L 12/28* (2006.01)
*H04L 12/823* (2013.01)
*H04L 12/26* (2006.01)
*H04L 12/803* (2013.01)
*H04L 12/743* (2013.01)

(52) U.S. Cl.
CPC ............ *H04L 47/32* (2013.01); *H04L 43/028* (2013.01); *H04L 43/12* (2013.01); *H04L 45/7453* (2013.01); *H04L 47/125* (2013.01)

(58) Field of Classification Search
CPC ............. H04L 45/7453; H04L 67/1023; H04L 9/3223; H04L 29/08234
See application file for complete search history.

(56) References Cited

U.S. PATENT DOCUMENTS

| 7,363,329 | B1 | 4/2008 | Bhagwan et al. |
| 7,400,626 | B2 | 7/2008 | Hong |
| 7,406,082 | B2 | 7/2008 | Nagarajan et al. |
| 7,619,993 | B2 | 11/2009 | Bender et al. |
| 7,729,240 | B1 | 6/2010 | Crane et al. |
| 8,179,792 | B1 | 5/2012 | Doerr et al. |
| 8,462,781 | B2 | 6/2013 | McGhee et al. |
| 2004/0109365 | A1 | 6/2004 | Stojancic |
| 2005/0018668 | A1 | 1/2005 | Cheriton |
| 2008/0065639 | A1 | 3/2008 | Choudhary et al. |
| 2009/0158046 | A1 | 6/2009 | Milliken et al. |
| 2009/0225676 | A1 | 9/2009 | Kisela et al. |
| 2010/0195519 | A1 | 8/2010 | Ji |
| 2011/0206055 | A1 | 8/2011 | Leong |
| 2011/0273982 | A1 | 11/2011 | Akirav et al. |
| 2011/0289281 | A1 | 11/2011 | Spackman |

OTHER PUBLICATIONS

Editcap, http://man-wiki.net/index.php/1:editcap, Feb. 19, 2011.
MurmurHash, http://en.wikipedia.org/wiki/MurmurHash, Feb. 2011.
PCT/US12/30881, International Search Report and Written Opinion, dated Jul. 17, 2012.

*Primary Examiner* — Alvin Zhu

(57) ABSTRACT

Systems and methods are disclosed for hash level load balancing for removal of duplicate network packets to form deduplicated packet streams. Hash values for input packets are used in part to select deduplication engines to receive hash data associated with received input packets, and this hash data is then forwarded to the selected deduplication engines for deduplication processing. The hash level load balancing reduces bandwidth requirements within the deduplication processing as compared to prior packet-based load balancing solutions for deduplication systems. Additional embodiments utilize port identifiers in addition to hash values to allow for increased flexibility in deduplication of packets from multiple input ports.

22 Claims, 9 Drawing Sheets

US 10,044,625 B2

HASH LEVEL LOAD BALANCING FOR DEDUPLICATION OF NETWORK PACKETS

TECHNICAL FIELD OF THE INVENTION

This invention relates to network communications and, more particularly, to real-time processing of network packet streams.

BACKGROUND

There is often a need with electronic systems to monitor network traffic. As such, devices have been developed that analyze data packets within network packet streams that are communicated across networks. These network communications can occur through a number of different systems and can include both wired and wireless communication links. The analysis of network packets can occur both off-line and in real-time. For off-line analysis of network packets, the network packets are stored and then later analyzed without providing real-time data network analysis. For real-time analysis of network packets, the network packets within the packet stream must be analyzed fast enough to keep up with the real-time flow of network traffic. As such, real-time analysis is more difficult to achieve than off-line analysis of network data packets.

One problem associated with analysis of network packets is the large number of packets that are communicated and the speed at which they are communicated. For example, many network systems utilize communication links that operate at speeds of 10 Gbps (gigabits per second) and above. And many network communication systems have large numbers of active communication links at a time. This problem of analyzing network packets in high volume and high speed networks is made worse because many devices that analyze network packets do so using filters and other parameters that can cause duplicate packets to be present in the packet streams being analyzed. For example, monitoring redundant communication links, monitoring both ends of a communication link, and mis-configuration of copy ports (e.g., SPAN ports on Cisco network switches) can lead to duplicate packets in network packet streams to be analyzed. These duplicate packets increase the bandwidth and processing speed needed by the analyzing devices to process packet streams.

One prior solution to this problem of duplicate packets is to provide off-line removal of duplicate packets followed by off-line analysis of captured network packets. For this off-line solution, packets within a network packet stream can be captured and stored. The captured packet data file can then be processed to remove duplicate packets. For this removal of duplicate packets, for example, length and MD5 sum for packets can be compared to the previous packets (e.g., previous four packets), and matching packets can be removed as duplicates. It is noted that MD5 is a known, large cryptographic hash algorithm, which can be used to generate large hash values. Once duplicate packets are removed, the packet data file can then be analyzed for various events and/or occurrences, as desired.

Other prior solutions for removal of duplicate packets are described in U.S. Pat. No. 8,462,781, which is hereby incorporated by reference in its entirety. In part, these solutions provide input packets to deduplication engines that generate hash values associated with the input packets and that use these hash values to identify and remove duplicate packets within the input packet stream.

FIG. 1A (Prior Art) is a block diagram of an embodiment 100 for a packet deduplication system described in U.S. Pat. No. 8,462,781. The input packet stream 102 is provided to a packet buffer 130 that stores the incoming packets pending the decision to delete or pass the packets to the output packet stream 132. The hash generator 103 receives the input packet stream 102 and generates one or more hash values using one or more hash algorithms. The one or more hash values are provided to the deduplication controller 110 through signal lines 104. The one or more hash values, or a subset thereof, are also provided to a deduplication window controller 125 through signal lines 106. The deduplication controller 110 utilizes at least one hash value to locate data for previously received packets 142 that is stored within data storage system 140. The data stored for each previously received packet can be, for example, the hash value(s) generated for the previously received packets. These stored hash value(s) are then obtained from the data storage system 140 by the deduplication controller 110 and used by the deduplication controller 110 for comparison to a hash value associated with the current incoming packet. If a match is found, the current incoming packet is deemed a duplicate packet, and the control signal 131 is a DELETE control signal. If a match is not found, the current incoming packet is deemed not to be a duplicate packet, and the control signal 131 is a PASS control signal. If a match is not found, the deduplication controller 110 also stores data associated with the hash value(s) for the current incoming packet in the data storage system 140. The deduplication controller 110 provides the DELETE/PASS control signal 131 to the packet buffer 130. If the control signal 131 is a DELETE control signal, the current packet is removed or deleted from the packet buffer 130 so that it does not become part of the output packet stream 132. If the control signal 131 is a PASS control signal, the current packet is allowed to pass from the packet buffer 130 so that it does become part of the output packet stream 132.

The deduplication window controller 125 operates to limit the amount of information stored with respect to incoming packets, and the deduplication window controller 125 can utilize one or more parameters to form a deduplication window (e.g., timestamps, number of packets). The deduplication window controller 125 can also receive hash value(s) through signal lines 106 from the hash generator 103 and can receive memory location information 136 and the DELETE/PASS control signal 131 from the deduplication controller 110. The deduplication window controller 125 utilizes this information to make determinations as to when to remove data stored for previously received packets. In part, the deduplication controller 125 can send control signals 138 that provide information to the deduplication controller 110 with respect to which packet information to remove. In this way, a deduplication window is created for limiting the amount of information stored for previously received packets.

FIG. 1B (Prior Art) is a block diagram of an embodiment 150 described in U.S. Pat. No. 8,462,781 that includes a load balancer 154. An input packet stream 152 is received by load balancer 154. Load balancer 154 distributes the input packet stream into multiple different packet streams 102A, 102B, 102C . . . and provides these different packet streams to multiple different deduplication engines 100A, 100B, 100C . . . for removal of duplicate packets. The individual output packet streams 132A, 132B, 132C . . . from the multiple deduplication engines 100A, 100B, 100C . . . are then be sent to a combiner 156. Combiner 156 combines the different packet outputs into a single output packet stream

158. The multiple deduplication engines 100A, 100B, 100C . . . use local memory storage of hash values associated with their respective individual input packet streams 102A, 102B, 102C . . . received from the load balancer 152. Each of the deduplication engines 100A, 100B, 100C . . . operate to identify duplicate packets in parallel. For certain further embodiments, hash algorithms can also be used to help generate the multiple input packet streams 102A, 102B, 102C . . . so that duplicate packets will end up in the same stream. For example, a pre-hash operation can be performed on the input packet stream 152, and the results could be used to help determine into which input packet streams 102A, 102B, 102C . . . to place each packet, thereby causing duplicate packets to end up in the same packet stream.

While such prior load balancing solutions help to spread individual packets within a packet stream among a plurality of deduplication engines, these prior solutions can also exhaust available memory or logic resources particularly where packet sizes are large.

SUMMARY OF THE INVENTION

Systems and methods are disclosed for hash level load balancing for removal of duplicate network packets to form deduplicated packet streams. Hash values for input packets are used in part to select deduplication engines to receive hash data associated with received input packets, and this hash data is then forwarded to the selected deduplication engines for deduplication processing. The hash level load balancing reduces bandwidth requirements within the deduplication processing as compared to prior packet-based load balancing solutions for deduplication systems. Additional embodiments utilize port identifiers in addition to hash values to allow for increased flexibility in deduplication of packets from multiple input ports. Other features and variations can be implemented, if desired, and related systems and methods can be utilized, as well.

For one embodiment, a method is disclosed for reducing duplicate packets in a stream of packets including receiving input packets from an input port, storing the input packets in a packet buffer, applying at least one hash algorithm to the input packets to generate hash values associated with the input packets, distributing hash data from the hash values among a plurality of deduplication engines based upon a portion of the hash values, processing the hash data with the plurality of deduplication engines to generate pass/drop instructions, combining the pass/drop instructions from the deduplication engines to form aggregated pass/drop instructions, and utilizing the aggregated pass/drop instructions to selectively pass or drop the input packets stored within the packet buffer such that pass instructions cause stored input packets to be included in an output packet stream and drop instructions cause stored input packets not to be included within the output packet stream.

In other embodiments, the processing includes comparing the hash data to stored hash data associated with previously received packets, generating pass instructions if no matches are found, and generating drop instructions if matches are found. In additional embodiments, an N-bit hash value is generated for each input packet; M bits of each N-bit hash value is used to select a deduplication engine; and N−M bits of each hash value are sent to the selected deduplication engine as the hash data. In further embodiments, the distributing comprises receiving the hash values from the hash generator and distributing the hash data among the deduplication engines based upon one or more channel selection bits selected from the hash values. Still further, the method can also include storing the one or more channel selection bits in a channel buffer, storing the pass/drop instructions from the deduplication engines in a plurality of pass/drop buffers, and using the channel selection bits to select pass/drop instructions from the pass/drop buffers to output as the aggregated pass/drop instructions.

In further embodiments, the method includes receiving input packets from a plurality of input ports, storing the input packets in a plurality of packet buffers, and using hash generators to generate hash values associated with input packets from each of the plurality of input ports. In addition, the method can also include tagging each of the hash values with a port identifier tag to indicate the input port associated with the hash value. Further, the method can also include using the hash value, the port identifier, or both the hash value and the port identifier to select a deduplication engine to receive the hash data. Still further, the method can also include configuring one or more port mapping tables to map input ports to one or more of the deduplication engines. In addition, the method can include modifying one or more bits within the hash value based upon the one or more port mapping tables and using the one or more modified bits for the distributing. In still further embodiments, at least two input ports are mapped to one or more first deduplication engines, and at least one additional input port is mapped to one or more second deduplication engines different from the one or more first deduplication engines.

For another embodiment, a packet deduplication system is disclosed for reducing duplicate packets including a packet buffer configured to receive input packets from an input port and to store the input packets, a hash generator configured to receive the input packets and to apply at least one hash algorithm to the input packets to generate hash values associated with the input packets, a load balancer configured to receive the hash values from the hash generator and to distribute hash data from each hash value to a selected deduplication engine from among a plurality of deduplication engines based upon a portion of each hash value, and a plurality of deduplication engines with each deduplication engine being configured to receive hash data from the load balancer and to output pass/drop instructions to the load balancer. In addition, the load balancer is further configured to receive the pass/drop instructions from each of the plurality of deduplication engines, to combine the pass/drop instructions, and to output aggregated pass/drop instructions. And the packet buffer is further configured to selectively pass or drop the stored input packets based upon the aggregated pass/drop instructions such that pass instructions indicate packets to be included in an output packet stream and drop instructions indicate packets not to be included within the output packet stream.

In other embodiments, each deduplication engine is further configured to compare the hash data to stored hash data associated with previously received packets, to generate pass instructions if no matches are found, and to generate drop instructions if matches are found. In additional embodiments, the load balancer is configured to generate an N-bit hash value for each input packet, to use M bits of the N-bit hash value to select a deduplication engine, and to send N−M bits of the hash value to the selected deduplication engine as the hash data.

In further embodiments, the system also includes a plurality of memory controllers coupled to the plurality of deduplication engines and a plurality of data storage systems coupled to the plurality of memory controllers, and the plurality of deduplication engines are configured to communicate with the plurality of memory controllers to store the hash data associated with previously received hash values in the plurality of data storage systems. In additional embodiments, the system also includes a configuration interface coupled to the load balancer and configured to allow configuration of one or more operational parameters for the load balancer. In other embodiments, the load balancer includes a scheduler configured to receive the hash values from the hash generator and to distribute the hash data among the deduplication engines based upon one or more channel selection bits selected from the hash values, a channel buffer configured to store the one or more channel selection bits, a plurality of pass/drop buffers, each pass/drop buffer being configured to store pass/drop instructions from one of the deduplication engines, and an arbiter configured to use the one or more channel selection bits from the channel buffer to select pass/drop instructions from the pass/drop buffers to output as the aggregated pass/drop instructions.

In still further embodiments, the packet buffer and the hash generator represent a first deduplication path for a first input port, and the system further includes one or more additional deduplication paths for one or more additional input ports with each additional deduplication path also including a packet buffer and a hash generator. In addition, the system can also include a tag engine configured to receive the hash values from the deduplication paths and to add a port identifier as a tag to each of the hash values to indicate the input port associated with the hash value. Further, the load balancer can be configured to use the hash value, the port identifier, or both the hash value and the port identifier to select a deduplication engine to receive the hash data. Still further, the system can also include one or more port mapping tables associated with the load balancer that map each of the input ports to one or more of the deduplication engines. In addition, the load balancer can be further configured to modify one or more bits within the hash value based upon the one or more port mapping tables and to use the one or more modified bits to distribute the hash data. The system can also include a configuration interface coupled to the load balancer and configured to allow configuration of the one or more port mapping tables. In still further embodiments, at least two input ports are mapped to one or more first deduplication engines, and at least one additional input port is mapped to one or more second deduplication engines different from the one or more first deduplication engines.

Different or additional features, variations, and embodiments can be implemented, if desired, and related systems and methods can be utilized, as well.

DESCRIPTION OF THE DRAWINGS

It is noted that the appended drawings illustrate only exemplary embodiments of the inventions and are, therefore, not to be considered limiting of their scope, for the inventions may admit to other equally effective embodiments.

DETAILED DESCRIPTION OF THE INVENTION

Systems and methods are disclosed for hash level load balancing for removal of duplicate network packets to form deduplicated packet streams. Hash values for input packets are used in part to select deduplication engines to receive hash data associated with received input packets, and this hash data is then forwarded to the selected deduplication engines for deduplication processing. The hash level load balancing reduces bandwidth requirements within the deduplication processing as compared to prior packet-based load balancing solutions for deduplication systems. Additional embodiments utilize port identifiers in addition to hash values to allow for increased flexibility in deduplication of packets from multiple input ports. Other features and variations can be implemented, if desired, and related systems and methods can be utilized, as well.

In contrast to prior solutions, the disclosed deduplication embodiments apply load balancing at the hash data level as opposed to applying load balancing at a packet level. A hash generator is placed in front of a load balancer and hash values are passed to the load balancer. The load balancer then distributes hash data among multiple deduplication engines based in part upon the hash values. As such, the disclosed embodiment reduce the risk of buffer overflow for the load balancer and improve performance by reducing required bandwidth as compared to solutions that distribute the packets themselves to deduplication engines. In addition, the disclosed embodiments allow for deduplication to be applied across multiple input ports by adding port identifiers and configuring load balancers to distribute packets based upon the incoming port instead of the hash values and/or in combination with the hash values. As such, increased flexibility is provided with respect to deduplication over multiple input ports for the deduplication embodiments. Further, as each packet results in one hash value or one set of hash values, the performance of disclosed deduplication embodiments do not degrade as packet size increases. In fact, for the disclosed embodiments, increased packet size can be beneficial in reducing hash collisions as fewer hash values are generated for a smaller number of larger packets as compared to hash values generated for a higher number of smaller packets. Thus, by load balancing hash data after generation of hash values rather than load balancing the input packets themselves, significant benefits are achieved by the disclosed embodiments, particularly in processing incoming packet streams at high operating line rates such as speeds of 10 gigabits per second (10 Gbps) or more.

Figure 1A:
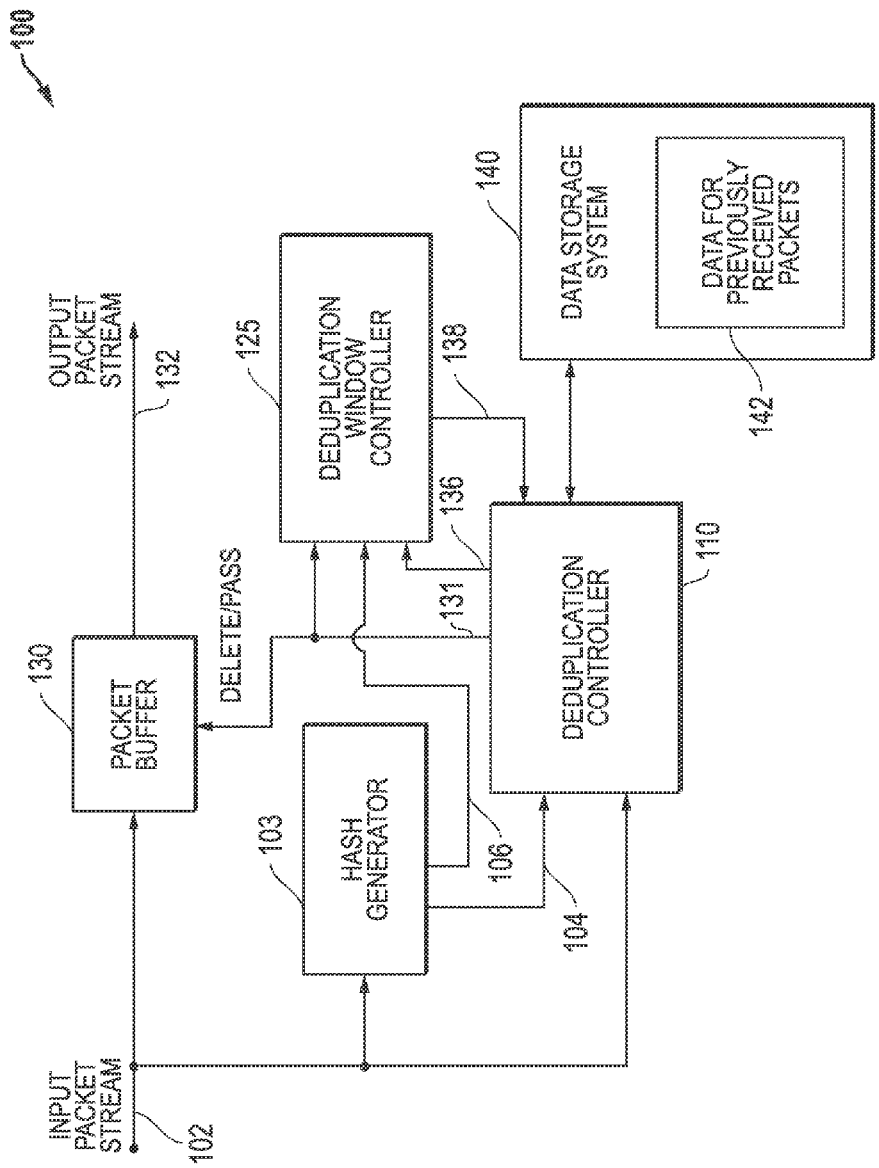
FIG. 1A (Prior Art) is a block diagram of an embodiment for a prior packet deduplication system.
Figure 1B:
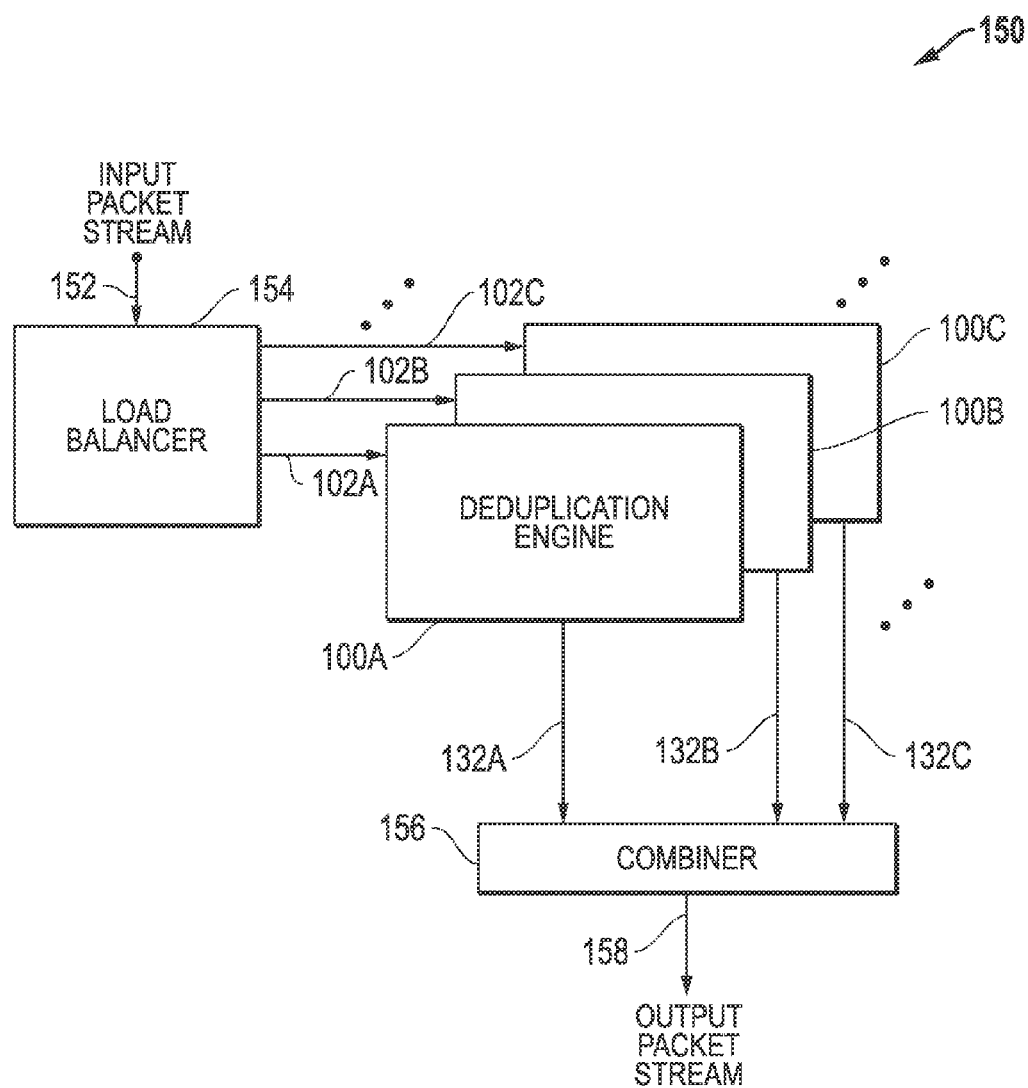
FIG. 1B (Prior Art) is a block diagram of an embodiment for a prior packet deduplication system that includes a load balancer that distributes packets among multiple packet streams that are provided to deduplication engines.
Figure 2:
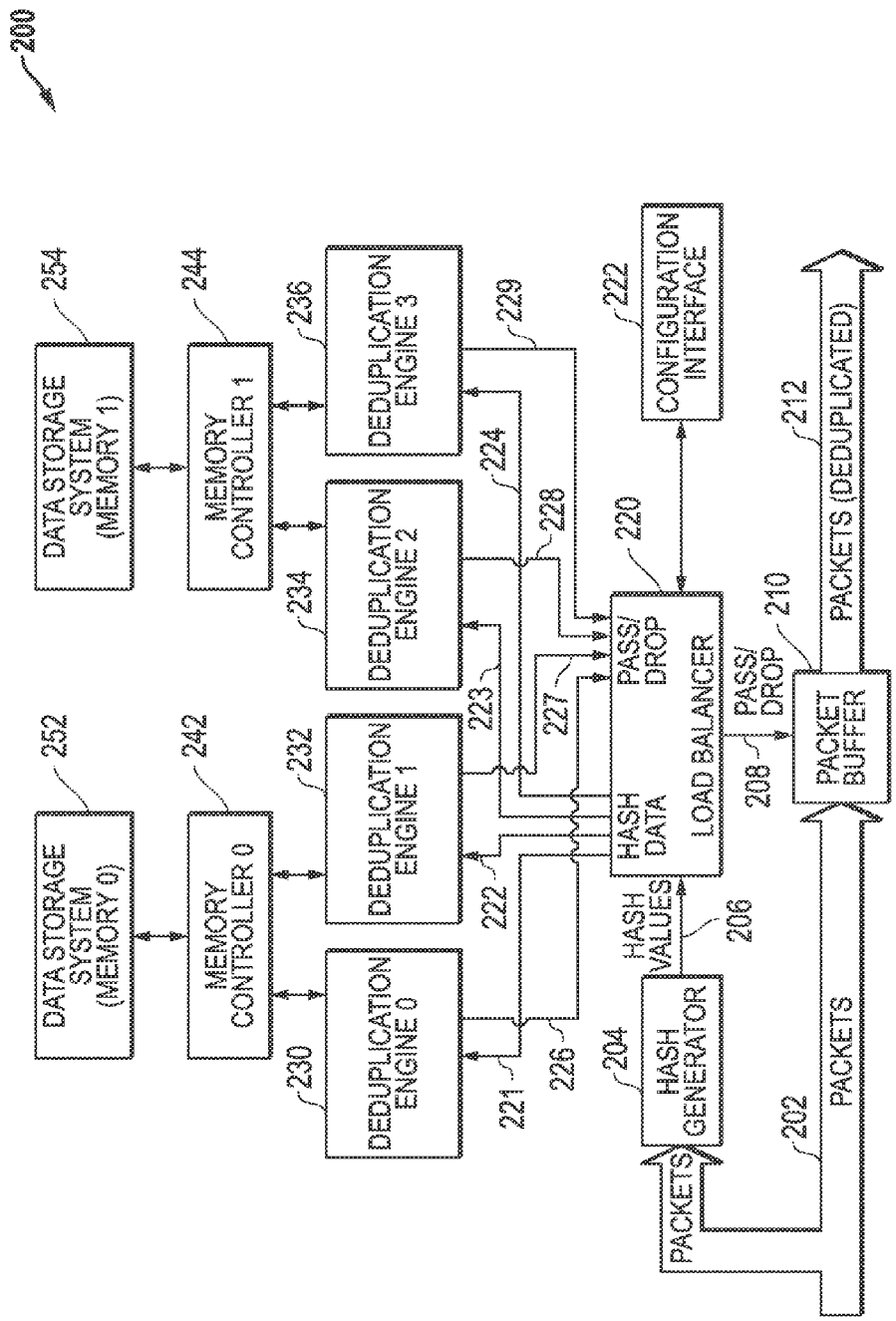
FIG. 2 is a block diagram of an example embodiment for a deduplication system including hash level load balancing that distributes hash data associated with hash values for received input packets among a plurality of deduplication engines.

FIG. 2 is a block diagram of an example embodiment 200 for a deduplication system including a load balancer 220 that load balances hash values for received packets among a plurality of deduplication engines 230, 232, 234, and 236. Input packets 202 are forwarded to a packet buffer 210, such as a FIFO (first-in-first-out) buffer, and input packets 202 are also forwarded to hash generator 204. The hash generator 204 applies one or more hash algorithms to contents of the input packets 202 and generates resulting hash values 206 associated with the received packets 202. These hash values 206 are received by load balancer 220, and the load balancer 220 uses these hash values 206 to select which deduplication engine 230, 232, 234, and 236 will receive hash data associated with each hash value. As such, hash data 221 is forwarded to deduplication engine (Engine0) 230; hash data 222 is forwarded to deduplication engine (Engine1) 232; hash data 223 is forwarded to deduplication engine (Engine2) 234; and hash data 224 is forwarded to deduplication engine (Engine3) 236. It is also noted that the hash data 221, 222, 223, and 224 can be one or more portions of the hash values 206 rather than the entire hash value, although the entire hash values 206 generated by the hash generator 204 can also be provided to the deduplication engines 230, 232, 234, and 236, if desired. For example, a first portion of each hash value 206 can be used to determine which deduplication engine 230, 232, 234, or 236 will receive a second portion of that hash value 206. Preferably, the load balancer 220 distributes the hash data to the deduplication engines 230, 232, 234, and 236 so that the workloads performed by the deduplication engines 230, 232, 234, and 236 are balanced. It is also noted that a configuration interface 222 is coupled to the load balancer 220 for some embodiments to allow for external and/or user configuration of the load balancer 220. For example, the load balancer 220 can be configured to distribute hash data among a subset of the deduplication engines 230, 232, 234, and 236 rather than among them all.

Deduplication engines 230, 232, 234, and 236 operate to determine if hash data associated with received packets represent duplicate packets by comparing hash data for new input packets to hash data that was previously stored for previously received packets. For example embodiment 200, deduplication engines 230 and 232 are coupled to memory controller (Controller0) 242 and to a data storage system (Memory0) 252. As such, deduplication engines 230 and 232 store hash data for previously received packets within one or more hash tables stored within data storage system 252. For the example embodiment 200, deduplication engines 234 and 236 are coupled to memory controller (Controller1) 244 and to a data storage system (Memory1) 254. As such, deduplication engines 234 and 236 store hash data for previously received packets within hash tables stored within data storage system 254. For the hash data for each received packet, the deduplication engines 230, 232, 234, and 236 generate a PASS instruction or DROP instruction associated with that packet-specific hash data that is provided back to the load balancer 220 as PASS/DROP instructions 226, 227, 228, and 229, respectively. If the packet-specific hash data is compared to the hash table and a match is not detected indicating no duplicate packet, then a PASS instruction is generated for that packet-specific hash data. If the packet-specific hash data is compared to the hash table and a match is detected indicating a duplicate packet, then a DROP instruction is generated for that packet-specific hash data. The load balancer 220 receives the PASS/DROP instructions 226, 227, 228, and 229 from the deduplication engines 230, 232, 234, and 236 and generates aggregated PASS/DROP instructions 208 to the packet buffer 210. The packet buffer 210 then uses these aggregated PASS/DROP instructions 208 to either pass or drop received packets 202 that are stored in the packet buffer 210. The resulting output packet stream 212 from the packet buffer 210 is thereby deduplicated so that duplicate packets are reduced or eliminated.

With respect to the hash generator 204, it is noted that one or more portions of the contents of the received input packets 202, including the entire contents of the received packets 202, can be selected and used for generating one or more hash values. For example, if only information relating to certain network protocol layers are desired to be used for generating the hash values, these layers can be identified and used by one or more hash algorithms to generate the hash values. It is further noted that example portions of received input packets 202 that could be utilized in generating hash values include, for example, MAC addresses, VLAN designations, source designations, destination designations, data payload, checksum data, and/or any other desired portion of the packet contents.

It is further noted that a variety of techniques can be utilized to implement the hash generator 204 in order to generate the hash values 206. For example, a single hash algorithm could be used to generate one or more hash values, and a single generated hash value can also be used to provide two or more different hash values. For example, a portion of the generated hash value could be used to provide a first hash value, and a portion of the generated hash value could be used to provide the second hash value. Further, these portions could overlap. Still further, a single hash algorithm could be used to form two different hash values based upon different parameters (i.e., different shift constants, different mixing functions and/or other different parameters). Still further, two or more different hash algorithms could be used to each generate one or more different hash values. In short, the hash generator 204 can be implemented using a wide variety of techniques, as desired, to generate one or more hash values 206 that can be used by the embodiments described herein.

It is further noted that any desired hash algorithm could be used. However, the hash algorithm or algorithms that are used in the deduplication embodiments described herein are preferably selected to generate hash values that generate even distributions across the range of possible hash values and that generate different hash values for similar data strings. Other considerations can also be used to select the hash algorithm(s). As indicated above, the hash values 206 can be generated through a variety of implementations. For example, the hash values can be achieved by taking two different bit-slices of a large hash (e.g., SHA-1 or MD5 generated hash values), by applying two different hash functions, or by applying the same hash function with different input parameters. Further, the hash value generation can be implemented using multiple instances of the hash algorithm(s) running in parallel so that real-time processing can be achieved.

It is noted that SHA-1, MD5, FNV and MurmurHash are known algorithms for generating hash values based upon selected input parameters. It is further noted that large cryptographic hash algorithms, such as MD5, may be difficult to utilize for the deduplication systems described herein because they tend to be complex and slow algorithms. It is also noted that PRBS, CRC and other cyclical polynomial computations (e.g., Reed Solomon) could also be utilized to generate hash values. While these cyclical polynomial computations can be easier to implement in hardware, they typically provide worse performance with respect to desirable hash parameters. Non-cryptographic hash algorithms can also be used to provide hash values. If desired, a non-cryptographic MurmurHash-type hash algorithm can be used and can be split into multiple 16-bit hash processes that execute in parallel followed by a final series of mixing steps. The mixing steps can be operated at 200 MHz or above, if desired. For one example implementation as described below, the hash values 206 for each packet can be generated as a 22-bit hash value. Other variations can also be implemented.

Figure 3:
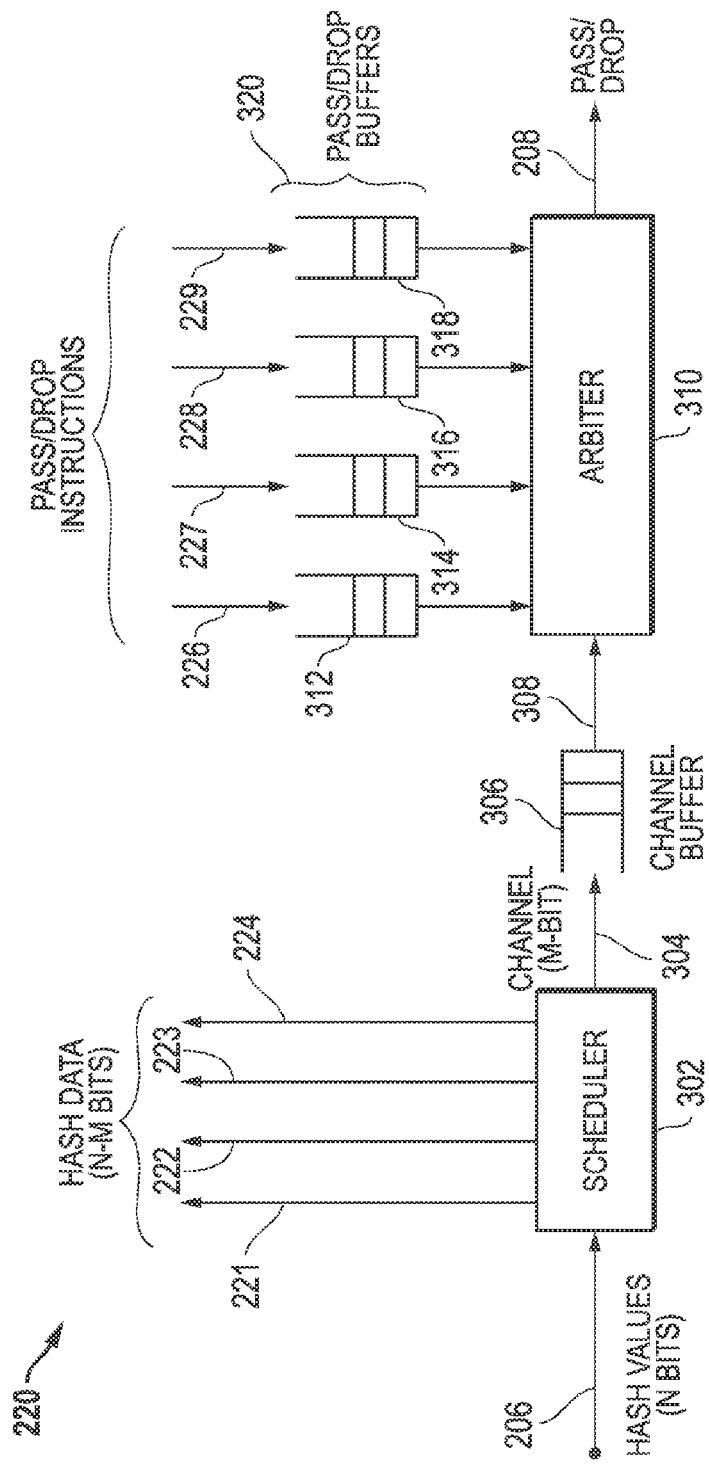
FIG. 3 is a block diagram of an example embodiment for the load balancer in FIG. 2.

FIG. 3 is a block diagram of an example embodiment for load balancer 220. Hash values 206 are received by a scheduler 302, and these hash values 206 can be N-bit hash values that are generated using one or more hash algorithms. The scheduler 302 then uses a portion (e.g., M bits) of each N-bit hash value to determine which of the deduplication engines 230, 232, 234, and 236 will receive hash data associated with this N-bit hash value. For example, where four deduplication engines are used, two bits of the N-bit hash value can be used to make this determination and select among the four deduplication engines. As further discussed below, an additional port identifier tag can be added to the N-bit hash value to identify the source input port for the received packet, and this port identifier can also be used for the determination of which deduplication engine to receive the hash data. Once the determination is made, hash data associated with the N-bit hash value is forwarded to the selected deduplication engine from the deduplication engines 230, 232, 234, and 236. For example, where M bits of the hash value 206 are used to select the deduplication engine, the remaining N−M bits can be forwarded as hash data 221, 222, 223, and 224 to the deduplication engines 230, 232, 234, and 236. In particular, hash data 221 is forwarded to deduplication engine (Engine0) 230; hash data 222 is forwarded to deduplication engine (Engine1) 232; hash data 223 is forwarded to deduplication engine (Engine2) 234; and hash data 224 is forwarded to deduplication engine (Engine3) 236. In addition, the selection data 304 used to make the forwarding determination, such as the M-bit data values from the hash values 206, are forwarded to a channel buffer 306. This selection data (e.g., M-bit values) 304 is then output as channel selection data 308 to arbiter 310. For the example where four deduplication engines are used, 2 bits from each hash value 206 can be used to select one of the four deduplication engines to receive the hash data associated with each input packet, and these 2-bit values 304 are then provided from the channel buffer 306 as 2-bit channel selection data 308 to arbiter 310 where they are used to select one of the PASS/DROP buffers 320 as described in more detail below. As one example, the N-bit hash values can be generated as a 22-bit hash values, and the hash data 221, 222, 223, and 224 can be 20-bit values where 2 bits are used to make the deduplication engine selection. Other variations can also be implemented.

As described above, the deduplication engines 230, 232, 234, and 236 compare the hash data to previous data stored in hash tables within the data storage systems 252/254, determine whether or not the hash data matches previously stored data, and then generate PASS/DROP instructions 226, 227, 228, and 229 based upon the existence or non-existence of hash data matches. These PASS/DROP instructions are stored in the PASS/DROP buffers 320. In particular, PASS/DROP instructions 226 are received from deduplication engine 230 and stored in PASS/DROP buffer 312 as a first PASS/DROP instruction channel. PASS/DROP instructions 227 are received from deduplication engine 232 and stored in PASS/DROP buffer 314 as a second PASS/DROP instruction channel. PASS/DROP instructions 228 are received from deduplication engine 234 and stored in PASS/DROP buffer 316 as a third PASS/DROP instruction channel. And PASS/DROP instructions 229 are received from deduplication engine 236 and stored in PASS/DROP buffer 318 as a fourth PASS/DROP instruction channel. The arbiter 310 receives the channel selection data 308 from the channel buffer 306, and the arbiter 310 uses each of these values (e.g., 2-bit values) to determine the PASS/DROP buffer from which to pull the next PASS/DROP instruction. Because each channel value 304 stored in the channel buffer 306 identifies the deduplication engine to which hash data for a specific packet is sent, these values 304 can also be used to select the PASS/DROP buffer from which to pull the next PASS/DROP instruction. As such, the values 304 stored within channel buffer 306 are output as channel selection data 308 to the arbiter 310. After pulling instructions from buffers 312, 314, 316 and 318 based upon the channel selection data 308, the arbiter 310 outputs the instructions as aggregated PASS/DROP instructions 208, which are provided to the packet buffer 210, as described above.

Figure 4:
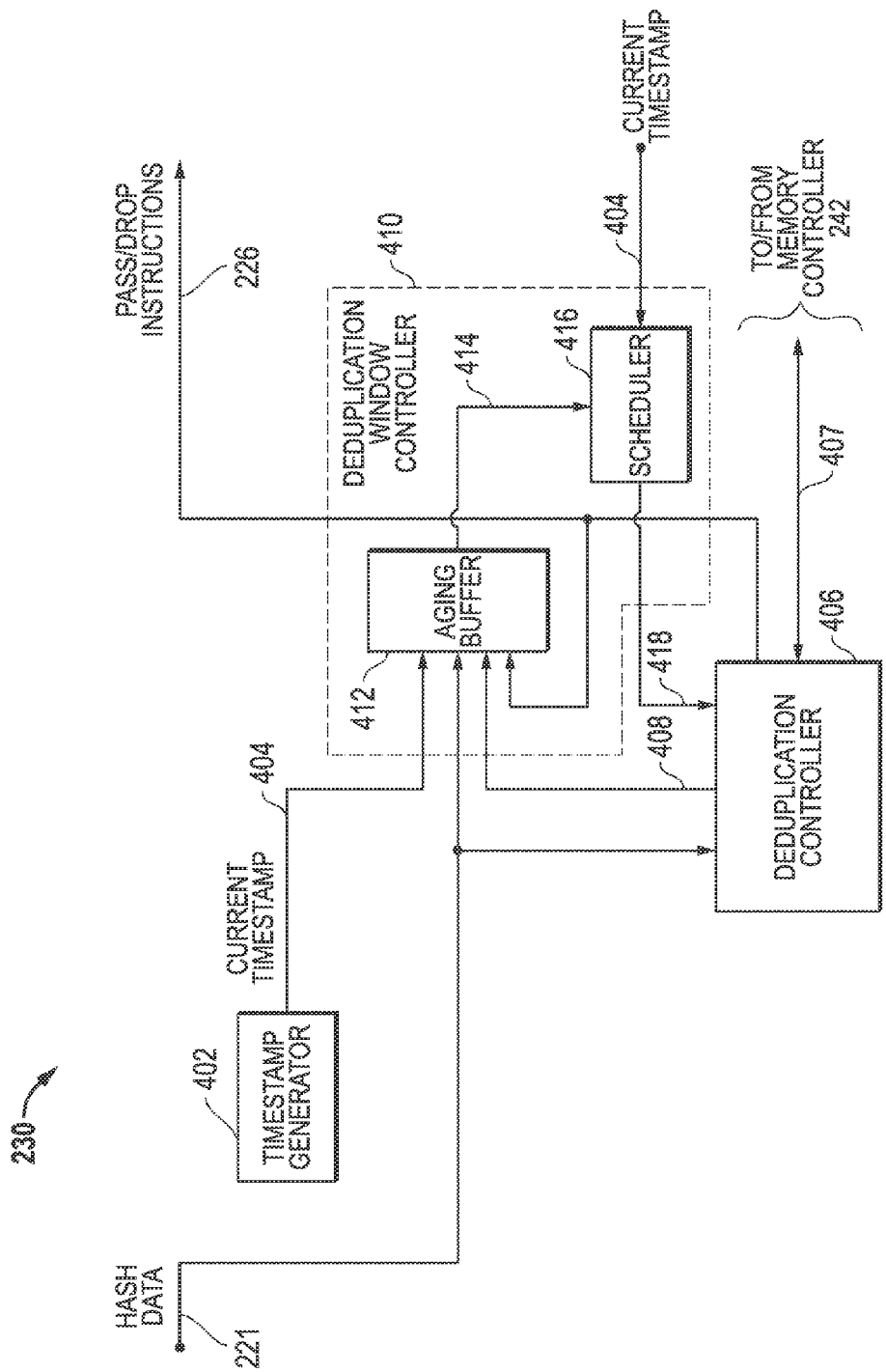
FIG. 4 is a block diagram of an example embodiment for the deduplication engine in FIG. 2.

FIG. 4 is a block diagram of an example embodiment for deduplication engine 230. It is noted that deduplication engines 232, 234, and 236 can be similarly implemented. The hash data 221 is provided to deduplication controller 406 and a deduplication window controller 410. For each received hash data value, the deduplication controller 406 communicates with the memory controller 242 to determine if matching hash data has been previously stored in data storage system 252. If a match is found, then the deduplication controller provides a DROP instruction as the instruction output 226. If a match is not found, then the deduplication controller provides a PASS instruction as the instruction output 226. The resulting PASS/DROP instructions 226 for the hash data 221 being received by the deduplication engine 230 are output to the load balancer 220. The deduplication window controller 410 includes an aging buffer 412, such as a FIFO buffer, and a scheduler 416. A timestamp generator 402 provides a current time stamp 404 to the aging buffer 412 and to the scheduler 416. The deduplication window controller 410 operates to determine a limited window within which hash data associated with input packets is stored within the data storage system 252 in order to reduce the amount of memory required for the data storage system 252 to store previously received hash data.

Example embodiments that utilize hash tables, deduplication controllers, deduplication windows, and/or deduplication window controllers are described in U.S. Pat. No. 8,462,781. U.S. Pat. No. 8,462,781 is again hereby incorporated by reference in its entirety. As described therein, a deduplication window and associated parameters are utilized to limit the number of previous hash data values that are stored and analyzed to a finite set within the deduplication window (e.g., window based on time, number of packets, etc.). Other embodiments and variations are also described therein.

As indicated above, port identifier tags can also be added to the hash values to allow for deduplication to be applied across multiple input ports. As such, the load balancer can be configured to distribute packets based upon the input port instead of the hash values and/or in combination with the hash values. As such, increased flexibility is provided with respect to deduplication over multiple input ports for the deduplication embodiments.

Figure 5:
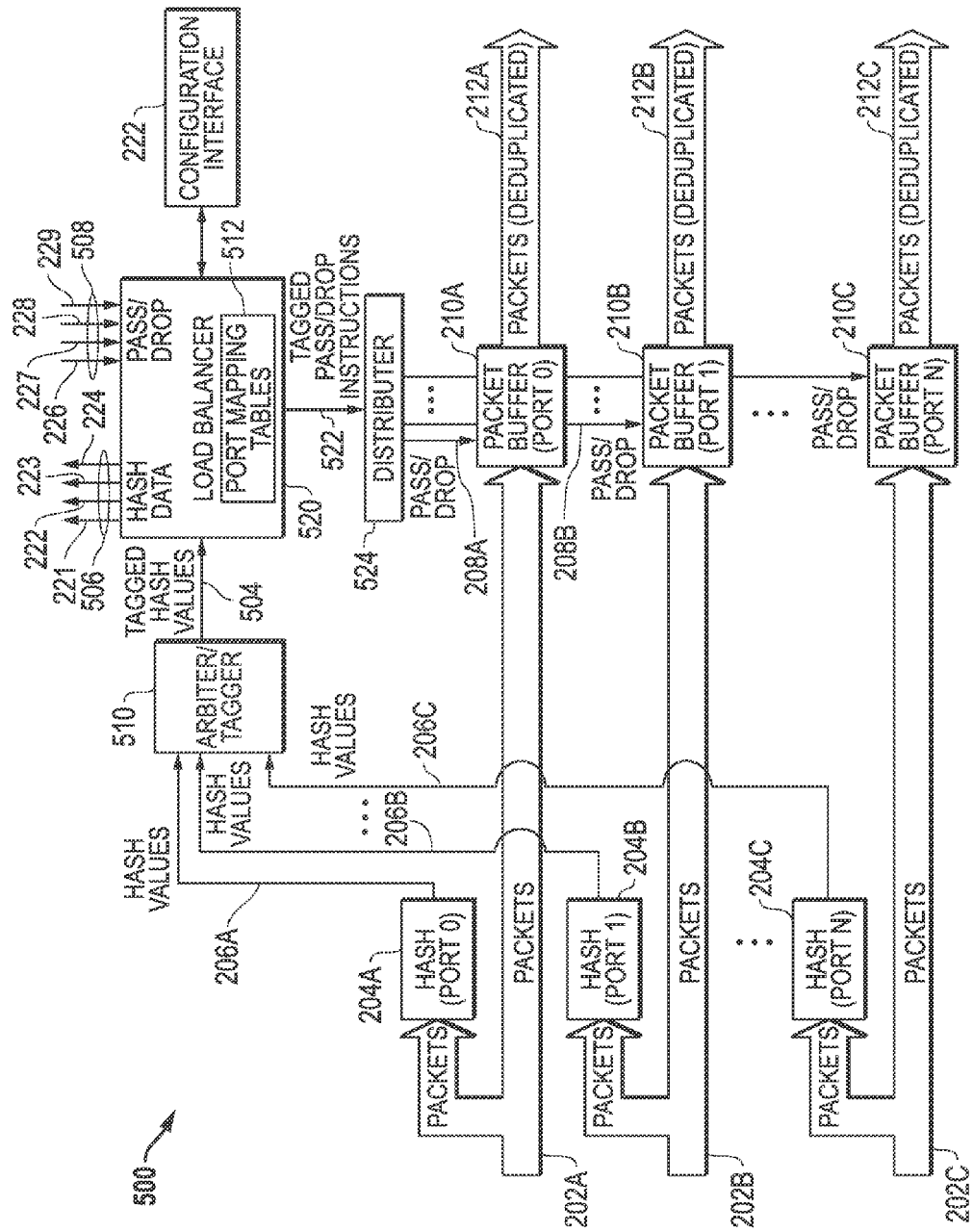
FIG. 5 is a block diagram of an example embodiment for a packet deduplication system that receives input packets at multiple input ports and applies port identifier tags so that packets can be deduplicated based upon hash values, port identifiers, or combinations of hash values and port identifiers.

FIG. 5 is a block diagram of an example embodiment 500 for a packet deduplication system that has multiple input ports (PORT0, PORT1 . . . PORT(N)) receiving input packets 202A, 202B . . . 202C and that adds port identifier tags to the hash values so that packets can be deduplicated based upon combinations of hash values and/or port identifiers. As depicted, N different deduplication paths are provided for N different input ports (PORT0, PORT1 . . . PORT(N)). Each deduplication path includes a hash generator 204A, 204B . . . 204C and packet buffer 210A, 210B . . . 210C, such as a FIFO (first-in-first-out) buffer. Hash values 206A, 206B . . . 206C are generated by the hash generators 204A, 204B . . . 204C and then tagged by an arbiter/tagger 510 with port identifiers. In particular, the arbiter/tagger 510 operates as a tag engine that identifies the source input port for the hash value and then adds a port identifier tag to the hash value that identifies this source input port. These tagged hash values 504 are then provided to the load balancer 520, which processes these tagged hash values 504 in part using port mapping tables 512 as described further below. Tagged hash data 506 is distributed by the load balancer 520 to the deduplication engines based in part upon these port mapping tables 512, which can be configured using the configuration interface 222 as also described further below. Tagged PASS/DROP instructions 508 are then received by the load balancer 520 from the duplication engines. The load balancer 520 aggregates the tagged PASS/DROP instructions 508 and outputs the aggregated/tagged PASS/DROP instructions 522 to a distributer 524. The distributer 524 uses the port identifier tags within the aggregated/tagged PASS/DROP instructions 522 to provide the PASS/DROP instructions 208A, 208B . . . 208C to the appropriate packet buffer 210A, 210B . . . 210C. It is noted that different embodiments could also be implemented while still providing hash values and resulting PASS/DROP instructions that are tagged with port identifiers so that deduplication engines can be selected based upon hash values, port identifiers, or both hash values and port identifiers.

Looking to the deduplication path for PORT0, the input packets 202A for PORT0 are received by hash generator 204A and are also forwarded to packet buffer 210A where they are stored pending PASS/DROP instructions 208A. The resulting hash values 206A from the hash generator 204A are provided to arbiter/tagger 510 wherein a port identifier tag for PORT0 is added to the hash values 206A. For example, where there are four (4) input ports, the port identifier tag can be a 2-bit data value that indicates the port number (e.g., 00 to identify PORT0, 01 to identify PORT1, 10 to identify PORT2, and 11 to identify PORT3). The load balancer 520 uses the port mapping tables 512 as described further below to determine which deduplication engines to use for processing hash values from PORT0. After processing by the deduplication engines and further processing by the load balancer 520, the distributer 524 receives the aggregated/tagged PASS/DROP instructions 522 and outputs PASS/DROP instructions 208A for PORT0 to the packet buffer 210A for PORT0. It is noted that the port identifier tags can be removed from the PASS/DROP instructions 208A when they are sent from the distributer 524 to the packet buffer 210A. Based upon the PASS/DROP instructions 208A, the packet buffer 210A passes or drops received packets 202A that are stored in packet buffer 210A. The resulting output packet stream 212A from the packet buffer 210A is thereby deduplicated so that duplicate packets are reduced or eliminated.

The additional deduplication paths process input packets 202B for PORT1 through input packets 202C for PORT(N) in the same way as the first deduplication path processes the input packets 202A for PORT0, as described above. In particular, the hash generator 204B and packet buffer 210B are used for input packets 202B for PORT1, and the arbiter/tagger 510 adds a port identifier tag for PORT1 to the hash values 206B from the hash generator 204B. Similarly, the hash generator 204C and packet buffer 210C are used for input packets 202C for PORT(N), and the arbiter/tagger 510 adds a port identifier tag for PORT(N) to the hash values 206C from the hash generator 204C. The distributer 524 ultimately provides the PASS/DROP instructions 208B for PORT1 to the packet buffer 210B and provides the PASS/DROP instructions 208C for PORT(N) to the packet buffer 210C. As such, the N deduplication paths use hash level load balancing to process input packets from multiple input ports (PORT0, PORT1 . . . PORT(N)) and to generate N different deduplicated packet streams 212A, 212B . . . 212C of output packets based upon PASS/DROP instructions 208A, 208B . . . 208C received by the packet buffers 210A, 210B . . . 210C, respectively.

As also described herein, a configuration interface 222 provides external and/or user configuration of the load balancer 520 and the port mapping tables 512. For example, as described below, the load balancer 520 and port mapping tables 512 can be configured to distribute hash data to the deduplication engines based upon the hash values, the port identifiers, or both the hash values and the port identifiers. Further, the load balancer 520 and the port mapping tables 512 can be configured to distribute hash data among a selected subset of the total number of available deduplication engines based upon the port identifiers and/or the hash values. In addition, other operational parameters can also be configured for the load balancer 520 through the configuration interface 222, as desired.

In operation, the arbiter/tagger 510 merges the hash values 206A, 206B . . . 206C from the hash generators 204A, 204B . . . 204C for the different input ports PORT0, PORT1 . . . PORT(N) into a single stream and tags each hash value with a port identifier that indicates the source input port. These tagged hash values 504 are then sent to the load balancer 520. The load balancer 520 uses one or more logical port mapping tables 512 to determine how input ports are mapped to deduplication engines. In particular, as described further below, each input port number can be mapped to one of the port mapping tables 512, and multiple port numbers can be mapped to the same table. Further, the port-to-table mapping is fully configurable through the configuration interface 222. For example, tagged hash values from PORT0 and PORT1 can be mapped to a first port mapping table that identifies a first set of deduplication engines to be used for PORT0 and PORT1. Similarly, tagged hash values from PORT2 and PORT3 can be mapped to a second port mapping table that identifies a second set of deduplication engines to be used for PORT2 and PORT3. As such, deduplication can be provided across PORT0 and PORT1, and deduplication can be provided across PORT2 and PORT3, independently. The resulting aggregated/tagged PASS/DROP instructions 522 from the load balancer 520 include the port identifier tag, and the distributor 524 uses these port identifier tags to distribute the PASS/DROP instructions 208A, 208B . . . 208C to the correct packet buffer 210A, 210B . . . 210C based on the port identifier tag.

By adding port identifiers, the embodiment 500 allows for significant flexibility in the deduplication of the input packet streams being received at multiple input ports (PORT0, PORT1 . . . PORT(N)). Further, this flexibility allows for packets received at multiple ports to be combined for deduplication processing while packets received at other ports are deduplicated individually. For example, in one embodiment the load balance 520 and the port mapping tables 512 can be configured to provide distribution of hash data to the following subsets of deduplication engines where there are four deduplication engines and four input ports:

PORT0—forwarded to ENGINE0 or ENGINE1 based upon hash value
PORT1—forwarded to ENGINE0 or ENGINE1 based upon hash value
PORT2—always forwarded to ENGINE2
PORT3—always forwarded to ENGINE3

For this example, therefore, if a port identifier indicates that the packet was received from PORT0 or PORT1, the corresponding hash value determines whether hash data is sent to ENGINE0 or ENGINE1. However, if a port identifier indicates that the packet was received from PORT2, the corresponding hash data is always sent to ENGINE2. Similarly, if a port identifier indicates that the packets was received from PORT3, the corresponding hash data is always sent to ENGINE3. As described above, the configuration interface 222 is coupled to the load balancer 520 and allows for external and/or user configuration of how the load balancer 520 and the port mapping tables 512 are used to distribute hash data among the deduplication engines.

Figure 6A:
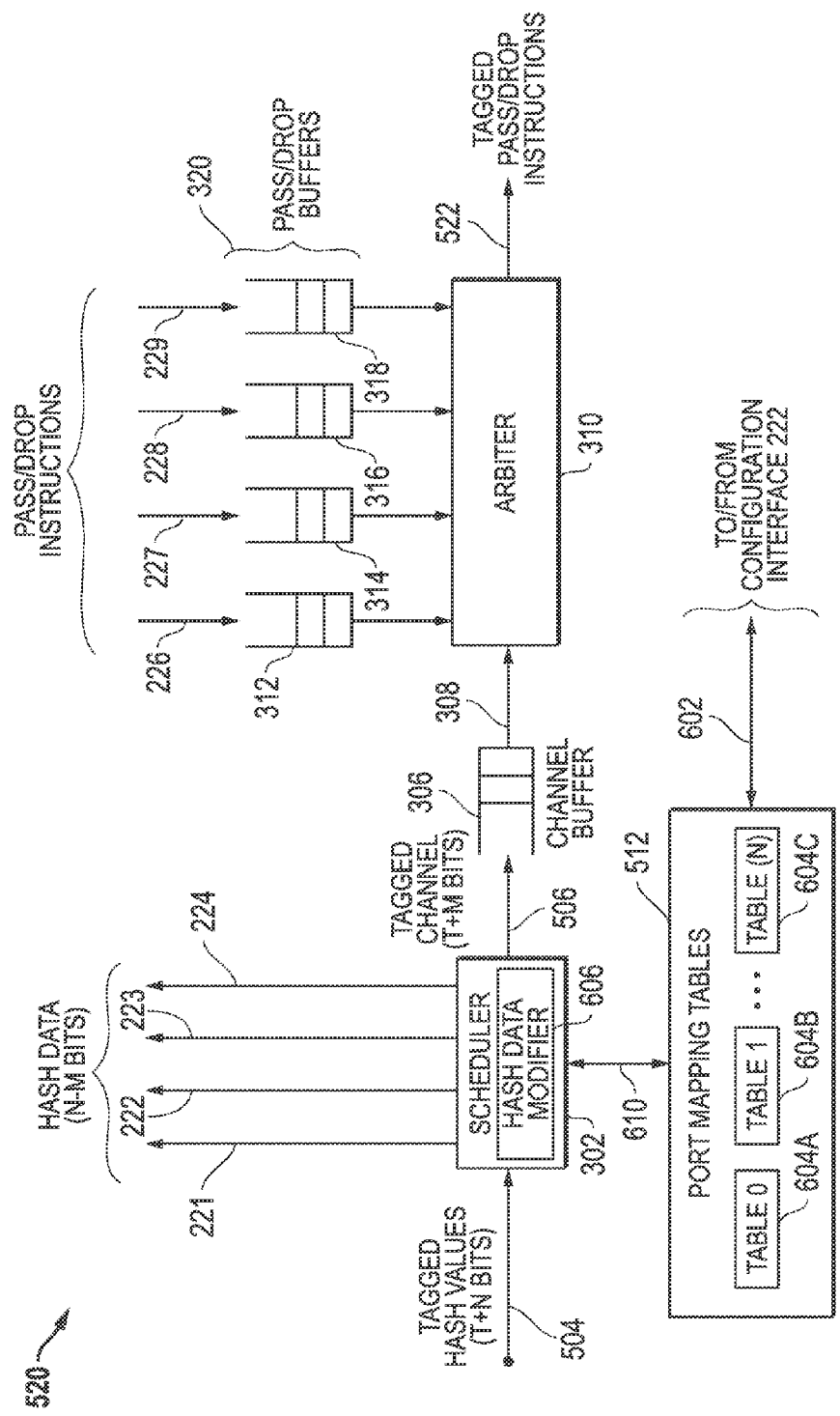
FIG. 6A is a block diagram of an example embodiment for the load balancer of FIG. 5.

FIG. 6A is a block diagram of an example embodiment for load balancer 520. The example embodiment of FIG. 6A operates similarly to the example embodiment for load balancer 220 in FIG. 3 with the addition of the port identifier tags (e.g., T bits) and the port mapping tables 512. As described herein, the port identifier tags allow deduplication to be based upon the hash values, the port identifiers, or a combination of hash values and port identifiers.

The tagged hash values 504 are first received by scheduler 302, and these tagged hash values 504 can include T-bit port identifier tags generated by the arbiter/tagger 510 combined with N-bit hash values generated by the hash generators 204A, 204B . . . 204C. For each tagged hash value 504, the scheduler 302 accesses the port mapping tables 512 through communications 610 to determine if the input port identified by each port identifier tag has been mapped to one or more particular deduplication engines. The port mapping tables 512 include one or more individual mapping tables 604A, 604B . . . 604C (TABLE0, TABLE1 . . . TABLE(N)) that are used to map input ports to deduplication engines. These mapping tables 604A, 604B . . . 604C can be configured using configuration instructions 602 received through the configuration interface 222. After accessing the port mapping tables 512, the scheduler 302 determines if the input port indicated by the port identifier tag for a hash value has been mapped to one or more deduplication engines. The scheduler 302 then distributes the hash data for the particular hash value based upon these port mappings.

For one embodiment, a hash data modifier 606 is used by the scheduler 302 to modify the hash values based upon the port mapping tables 512. In particular, if a mapping is indicated by the port mapping tables 512, the hash data modifier 606 within the scheduler 302 modifies the M-bit portion of the N-bit hash value that is used to provide the channel data 304 and determine which of the deduplication engines 230, 232, 234, and 236 receives the hash data. The hash data modifier 606 modifies this M-bit data value to make sure that the selected group of one or more deduplication engines mapped for the input port will in fact receive the hash data for that mapped input port. As described further below, the hash data modifier 606 can also modify other portions of the N-bit hash value. For example, where a first portion of the hash value is used as an index (I) for rows within hash tables stored within the data storage systems 252/254 and a second portion of the hash value is used as a key (K) stored within rows for these hash tables, the index (I) and/or key (K) data can be modified in addition to and/or instead of the M-bit channel data within the hash value. Other variations can also be implemented.

For example, considering the example above for four input ports and four deduplication engines, a first mapping table (TABLE0) 604A can be used to map first and second ports (PORT0 and PORT1) to first and second deduplication engines (ENGINE0 and ENGINE1). A second mapping table (TABLE1) 604B can be used to map a third port (PORT2) to a third deduplication engine (ENGINE2). And a third mapping table (TABLE2) can be used to map a fourth port (PORT3) to a fourth deduplication engine (ENGINE3). When a tagged hash value 504 is received, the scheduler 302 then uses the port identifier tag (e.g., T bits) to determine the deduplication engine(s) to which the input port is mapped. The hash data modifier 606 then adjusts the M-bit portion of the N-bit hash value so that the hash data will be forwarded to the mapped group of deduplication engines.

The following TABLE 1 provides examples for this channel data (M-bit) modification that can be performed by the hash data modifier 606. For TABLE 1, it is assumed that there are only four deduplication engines so that the channel data (M) is 2 bits of data, that there are only four input ports so that the port identifier tag (T) is 2 bits of data, and that the hash value is 16 bits of data with an index value (I) being four bits and key data (K) being 14 bits. The "x" represents bits that can be either a logic "1" or a logic "0," and underlining represents data bits that have been modified. As shown, for tagged values from PORT0 (port tag of 00) and from PORT1 (port tag of 01) which are grouped together in a first Group (group tag 00 or GROUP0), the most significant bit of the last two bits is forced to "0" so that the least significant bit can determine whether ENGINE0 or ENGINE1 receives the hash data (N–M bits) from these ports. For the tagged values from PORT2 (port tag of 10) which makes up a second group (group tag 01 or GROUP1), the last two bits are always forced to "10" so that ENGINE2 receives the hashed data (N–M bits) for this port. For the tagged values from PORT3 (port tag of 11) which makes up a third group (group tag 10 or GROUP2), the last two bits are always forced to "11" so that ENGINE3 receives the hashed data (N–M bits) for this port.

TABLE 1

EXAMPLE CHANNEL DATA (M) MODIFICATIONS

| Port | Group | Port Tag (T) (2 Bits) | Hash Value (N Bits) Memory Index Value (I) (4 bits) | Memory Key Data (K) (10 bits) | Channel Data (M) (2 Bits) | Modified Channel Data (M) (2 bits) |
|---|---|---|---|---|---|---|
| PORT0 | 00 (Group0) | 00 | xxxx | xxxxxxxxxx | 00 | 00 |
|  |  | 00 | xxxx | xxxxxxxxxx | 01 | 01 |
|  |  | 00 | xxxx | xxxxxxxxxx | 10 | 00 |
|  |  | 00 | xxxx | xxxxxxxxxx | 11 | 01 |
| PORT1 | 00 (Group0) | 01 | xxxx | xxxxxxxxxx | 00 | 00 |
|  |  | 01 | xxxx | xxxxxxxxxx | 01 | 01 |
|  |  | 01 | xxxx | xxxxxxxxxx | 10 | 00 |
|  |  | 01 | xxxx | xxxxxxxxxx | 11 | 01 |
| PORT2 | 01 (Group1) | 10 | xxxx | xxxxxxxxxx | 00 | 10 |
|  |  | 10 | xxxx | xxxxxxxxxx | 01 | 10 |
|  |  | 10 | xxxx | xxxxxxxxxx | 10 | 10 |
|  |  | 10 | xxxx | xxxxxxxxxx | 11 | 10 |
| PORT3 | 10 (Group2) | 11 | xxxx | xxxxxxxxxx | 00 | 11 |
|  |  | 11 | xxxx | xxxxxxxxxx | 01 | 11 |
|  |  | 11 | xxxx | xxxxxxxxxx | 10 | 11 |
|  |  | 11 | xxxx | xxxxxxxxxx | 11 | 11 |

It is noted that the tag generated by the arbiter/tagger 510 is the port number for the input port. This tag is not changed by the hash data modifier 606. Rather, the tag (T) goes with the channel number as tagged channel data 506 to the channel buffer 306 and then to the arbiter 310 as channel data 308. The arbiter 310 sends the port tags with the tagged pass/drop instructions 522 to the distributer 524. The distributer 524 uses the port tag to send the each pass/drop instruction to the correct packet buffer 210-C.

It is further noted that the hash data modifier 606 can also modify other data within the hash value so that memory space and bandwidth between different groups can be controlled. For example, if the channel data bits (M) are modified based upon input port groups, the groups will be assigned to their own engines. These modifications, therefore, provide a fixed memory bandwidth and memory space for a group of input ports. This technique is useful, for example, if it is desirable for groups not to interfere with each other. If the index data bits (I) are modified based upon input port groups, each group will have its own set of rows in the has tables although these rows will be spread across all channels. As such, the memory bandwidth will be shared between the different groups but each group will have its own rows of memory space. If the key data bits (K) are modified based upon the input port groups, then the memory bandwidth and the memory space will be shared across all groups. It is also noted that modifications can be used individually or they can be used in any desired combination. For example, modifications can be made to the channel data bits (M), the key data bits (K), and to the index data bits (I) in any desired combination. As such, how the memory bandwidth and memory space is shared between groups can be controlled using these hash data modifications.

Figures 6B, 6C:
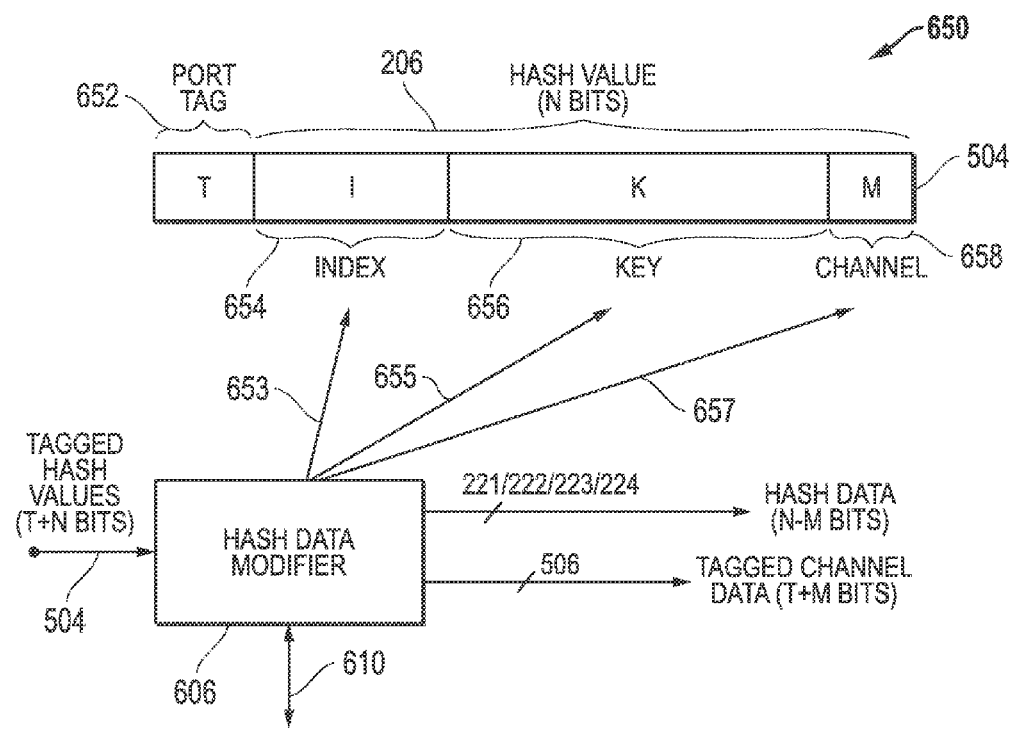
FIG. 6B is a block diagram of an example embodiment for data modifications that can be made by the hash data modifier.
FIG. 6C provides an example embodiment for a hash table that can be stored within a data storage system with respect to the example tagged hash values of FIG. 6B.

FIG. 6B is a block diagram of an example embodiment 650 for data modifications that can be made by the hash data modifier 606. As described above, tagged hash values (T+N bits) 504 are received by the hash data modifier 606 and the port mapping tables 512 are accessed to determine how packets from the input ports are to be handled by the available deduplication engines. For the example embodiment 650, the tagged hash value 504 includes a port tag (T bits) 652, a memory index value (I bits) 654, a memory data key (K bits) 656, and channel selection data (M bits) 658. The hash data modifier 606 can modify the data within the hash value based upon one or more of a modification 653 to the data within the memory index (I) 654, a modification 655 to the data within the key data (K) 656, and/or a modification to the data within the channel data (M) 658. The resulting hash data within the channel bits (N–M bits) can then be output by the scheduler 302 to the deduplication engines through communications 221/222/223/224 as described herein. The resulting channel data (M) can be combined with the port tag (T) and provided as tagged channel data (T+M bits) 506 to the channel buffer 306.

FIG. 6C provides an example embodiment 670 for a hash table that can be stored within the data storage system 252/254 with respect to the example tagged hash value 504 of FIG. 6B. The index value (I) 654, as modified by the hash data modifier 606 if at all, is used to select one of the N rows (I0, I1 . . . IN) of the hash table 670. Once selected, the key data (K) 656, as modified by the hash data modifier 606 if at all, is compared against prior key data values stored within the hash table 670 for that selected row. If there is a match in the selected row, then a DROP instruction is returned. If there is no match within the selected row, then a PASS instruction is returned and the key data (K) 656 is stored within the hash table 670. For the embodiment 670, there can be N different key data values stored in the first row (K00, K01 . . . K0N); N different key data values stored in the second row (K10, K11 . . . K1N); and so on with N different key data values also being able to be stored within the Nth row (KN0, KN1 . . . KNN). If a row becomes completely filled with N key data values, the next key data value can be stored within an overflow data storage medium, such as a content addressable memory (CAM). If the overflow memory is also full, the key data value can be discarded and/or stored in some further data storage medium. Further, as indicated above, key data values can be removed from the hash table 670 based upon a deduplication time window. Other variations can also be implemented.

The TABLES described below now provide further example embodiments for data modifications that can be made by the hash data modifier 606 to the data within the tagged hash values 504 based upon the port mapping tables 512. These TABLES along with TABLE 1 above provide example embodiments and variations can be implemented, as desired, while still taking advantage of the port tagging techniques described herein.

The following TABLE 2 provides examples for data modifications to the index value (I) that can be performed by the hash data modifier 606. For TABLE 2, it is again assumed that there are only four deduplication engines so that the modified portion of the index value (I) is 2 bits of data. The "x" again represents bits that can be either a logic "1" or a logic "0," and underlining represents data bits that have been modified. As shown, for tagged values from PORT0 (port tag of 00) and from PORT1 (port tag of 01) which are grouped together in a first Group (group tag 00 or GROUP0), the most significant two bits of the index value (I) is forced to "00" so that a fixed set of rows within the hash tables will be used for this group of input ports (GROUP0), and rows within this fixed set of rows will be selected by the least significant two bits of the index value (I). For the tagged values from PORT2 (port tag of 10) which makes up a second group (group tag 01 or GROUP1), the first two bits of the index value (I) are always forced to "01" so that a fixed set of rows within the hash tables will be used for this group of input ports (GROUP1), and rows within this fixed set of rows will be selected by the least significant two bits of the index value (I). For the tagged values from PORT5 (port tag of 11 ) which makes up a third group (group tag 10 or GROUP2), the first two bits of the index value (I) are always forced to "10" so that a fixed set of rows within the hash tables will be used for this group of input ports (GROUP2), and rows within this fixed set of rows will be selected by the least significant two bits of the index value (I).

the hash data modifier 606. For TABLE 3, it is again assumed that there are only four deduplication engines so that the modified portion of the key data (K) is 2 bits of data. The "x" again represents bits that can be either a logic "1" or a logic "0," and underlining represents data bits that have been modified. As shown, for tagged values from PORT0 (port tag of 00) and from PORT1 (port tag of 01) which are grouped together in a first Group (group tag 00 or GROUP0), the most significant two bits of the key data (K) is forced to "00" so that only certain previously stored key data can match new key data for this group of input ports (GROUP0) based upon the least significant eight bits of the key data (K). For the tagged values from PORT2 (port tag of 10) which makes up a second group (group tag 01 or GROUP1), the first two bits of the key data (K) are always forced to "01" so that only certain previously stored key data can match new key data for this group of input ports (GROUP1) based upon the least significant eight bits of the key data (K). For the tagged values from PORT3 (port tag of 11) which makes up a third group (group tag 10 or GROUP2), the first two bits of the key data (K) are always forced to "10" so that only certain previously stored key data can match new key data for this group of input ports (GROUP0) based upon the least significant eight bits of the key data (K).

TABLE 2

EXAMPLE INDEX VALUE (I) MODIFICATIONS

| | | Hash Value (N Bits) | | | |
|---|---|---|---|---|---|
| Port | Group | Port Tag (T) (2 Bits) | Memory Index Value (I) (4 bits) | Memory Key Data (K) (10 bits) | Channel Data (M) (2 bits) | Modified Index Value (I) (4 bits) |
| PORT0 | 00 | 00 | 0000 | xxxxxxxxxx | xx | <u>00</u>00 |
| | (Group0) | 00 | 0001 | xxxxxxxxxx | xx | <u>00</u>01 |
| | | . . . | . . . | . . . | . . . | . . . |
| | | 00 | 1111 | xxxxxxxxxx | xx | <u>00</u>11 |
| PORT1 | 00 | 01 | 0000 | xxxxxxxxxx | xx | <u>00</u>00 |
| | (Group0) | 01 | 0001 | xxxxxxxxxx | xx | <u>00</u>01 |
| | | 01 | . . . | . . . | . . . | . . . |
| | | 01 | 1111 | xxxxxxxxxx | xx | <u>00</u>11 |
| PORT2 | 01 | 10 | 0000 | xxxxxxxxxx | xx | <u>01</u>00 |
| | (Group1) | 10 | 0001 | xxxxxxxxxx | xx | <u>01</u>01 |
| | | 10 | . . . | . . . | . . . | . . . |
| | | 10 | 1111 | xxxxxxxxxx | xx | <u>01</u>11 |
| PORT3 | 10 | 11 | 0000 | xxxxxxxxxx | xx | <u>10</u>00 |
| | (Group2) | 11 | 0001 | xxxxxxxxxx | xx | <u>10</u>01 |
| | | 11 | . . . | . . . | . . . | . . . |
| | | 11 | 1111 | xxxxxxxxxx | xx | <u>10</u>11 |

The following TABLE 3 provides examples for data modifications to the key data (K) that can be performed by

TABLE 3

EXAMPLE KEY DATA (K) MODIFICATIONS

| | | Hash Value (N Bits) | | | |
|---|---|---|---|---|---|
| Port | Group | Port Tag (T) (2 Bits) | Memory Index Value (I) (4 bits) | Memory Key Data (K) (10 bits) | Channel Data (M) (2 bits) | Modified Key Data (K) (10 bits) |
| PORT0 | 00 | 00 | xxxx | 0000000000 | xx | <u>00</u>00000000 |
| | (Group0) | 00 | xxxx | 0000000001 | xx | <u>00</u>00000001 |
| | | . . . | . . . | . . . | . . . | . . . |
| | | 00 | xxxx | 1111111111 | xx | <u>00</u>11111111 |
| PORT1 | 00 | 01 | xxxx | 0000000000 | xx | <u>00</u>00000000 |

TABLE 3-continued

EXAMPLE KEY DATA (K) MODIFICATIONS

| | | Hash Value (N Bits) | | | | |
|---|---|---|---|---|---|---|
| Port | Group | Port Tag (T) (2 Bits) | Memory Index Value (I) (4 bits) | Memory Key Data (K) (10 bits) | Channel Data (M) (2 bits) | Modified Key Data (K) (10 bits) |
| | (Group0) | 01 | xxxx | 0000000001 | xx | 0000000001 |
| | | 01 | ... | ... | ... | ... |
| | | 01 | xxxx | 1111111111 | xx | 0011111111 |
| PORT2 | 01 | 10 | xxxx | 0000000000 | xx | 0100000000 |
| | (Group1) | 10 | xxxx | 0000000001 | xx | 0100000001 |
| | | 10 | ... | ... | ... | ... |
| | | 10 | xxxx | 1111111111 | xx | 0111111111 |
| PORT3 | 10 | 11 | xxxx | 0000000000 | xx | 1000000000 |
| | (Group2) | 11 | xxxx | 0000000001 | xx | 1000000001 |
| | | 11 | ... | ... | ... | ... |
| | | 11 | xxxx | 1111111111 | xx | 1011111111 |

It is noted that TABLES 1-3 above provide simplified examples for four input ports and four deduplication engines where two input ports share two deduplication engines and where the other two input ports are deduplicated individually. As such, it is further noted that the number of input ports, the number of deduplication engines, and/or the mapping configurations can be more complicated. It is also noted that TABLES 1-3 provide example data values and are not intended to describe every possible combination of data values. Variations can be implemented, as desired, while still taking advantage of the port tagging techniques described herein.

As a further example, TABLES 4A-C described below provide example modifications to the channel data (M) and the index value (I) within the hash value where three input ports are being spread across four deduplication engines and where none of these three input ports are being deduplicated together. For this example, hash data associated with a first port (PORT0) is being sent to ENGINE0 and ENGINE1, and hash data associated with a second port (PORT1) is being sent to ENGINE2 and ENGINE3. Further, hash data associated with a third port (PORT2) is being spread across all four engines. And the hash data from these ports is not being deduplicated together. Within TABLES 4A-C, the "x" again represents bits that can be either a logic "1" or a logic "0," and underlining represents data bits that have been modified.

As shown in TABLE 4A above, for tagged values from PORT0 (port tag of 00) which forms a first Group (group tag 00 or GROUP0), the most significant two bits of the most significant bit of the last two bits is forced to "0" so that the least significant bit can determine whether ENGINE0 or ENGINE1 receives the hash data (N–M bits) from this group of ports (GROUP0). For tagged values from PORT1 (port tag of 01) which forms a second Group (group tag 01 or GROUP1), the most significant two bits of the most significant bit of the last two bits is forced to "1" so that the least significant bit can determine whether ENGINE2 or ENGINE2 receives the hash data (N–M bits) from this group of ports (GROUP1). For tagged values from PORT2 (port tag of 10) which forms a third Group (group tag 10 or GROUP2), the channel data (M) is left unchanged so that these bits can determine whether ENGINE0, ENGINE1, ENGINE2, or ENGINE3 receives the hash data (N–M bits) from this group of ports (GROUP2).

TABLE 4A

ADDITIONAL EXAMPLE INPUT PORT DISTRIBUTION AND CHANNEL DATA (M) MODIFICATIONS

| | | Hash Value (N Bits) | | | | |
|---|---|---|---|---|---|---|
| Port | Group | Port Tag (T) (2 Bits) | Memory Index Value (I) (4 bits) | Memory Key Data (K) (10 bits) | Channel Data (M) (2 bits) | Modified Channel Data (M) (2 bits) |
| PORT0 | 00 | 00 | 0000 | xxxxxxxxxx | 00 | 00 |
| | (Group0) | 00 | 0001 | xxxxxxxxxx | 01 | 01 |
| | | ... | ... | ... | ... | 00 |
| | | 00 | 1111 | xxxxxxxxxx | 11 | 01 |
| PORT1 | 01 | 01 | 0000 | xxxxxxxxxx | 00 | 10 |
| | (Group1) | 01 | 0001 | xxxxxxxxxx | 01 | 11 |
| | | 01 | ... | ... | ... | 10 |
| | | 01 | 1111 | xxxxxxxxxx | 11 | 11 |
| PORT2 | 10 | 10 | 0000 | xxxxxxxxxx | 00 | 00 |
| | (Group2) | 10 | 0001 | xxxxxxxxxx | 01 | 01 |
| | | 10 | ... | ... | ... | 10 |
| | | 10 | 1111 | xxxxxxxxxx | 11 | 11 |

TABLE 4B

ADDITIONAL EXAMPLE INPUT PORT DISTRIBUTION AND INDEX VALUE (I) MODIFICATIONS

| | | | Hash Value (N Bits) | | | |
|---|---|---|---|---|---|---|
| Port | Group | Port Tag (T) (2 Bits) | Memory Index Value (I) (4 bits) | Memory Key Data (K) (10 bits) | Channel Data (M) (2 bits) | Modified Index Value (I) (2 bits) |
| PORT0 | 00 | 00 | 0000 | xxxxxxxxxx | xx | <u>00</u>00 |
| | (Group0) | 00 | 0001 | xxxxxxxxxx | xx | <u>00</u>01 |
| | | ... | ... | ... | ... | ... |
| | | 00 | 1111 | xxxxxxxxxx | xx | <u>00</u>11 |
| PORT1 | 01 | 01 | 0000 | xxxxxxxxxx | xx | <u>01</u>00 |
| | (Group1) | 01 | 0001 | xxxxxxxxxx | xx | <u>01</u>01 |
| | | 01 | ... | ... | ... | ... |
| | | 01 | 1111 | xxxxxxxxxx | xx | <u>01</u>11 |
| PORT2 | 10 | 10 | 0000 | xxxxxxxxxx | xx | <u>10</u>00 |
| | (Group2) | 10 | 0001 | xxxxxxxxxx | xx | <u>10</u>01 |
| | | 10 | ... | ... | ... | ... |
| | | 10 | 1111 | xxxxxxxxxx | xx | <u>10</u>11 |

As shown in TABLE 4B, the index values (I) are also being modified to avoid deduplication across the input ports that are sharing deduplication engines (PORT0 /PORT2, PORT1/PORT2). For tagged values from PORT0 (port tag of 00) which forms the first Group (group tag 00 or GROUP0), the most significant two bits of the index value (I) is forced to "00" so that a fixed set of rows within the hash tables will be used for this group of input ports (GROUP0). For tagged values from PORT1 (port tag of 01) which forms the second Group (group tag 01 or GROUP1), the most significant two bits of the index value (I) is forced to "01" so that a fixed set of rows within the hash tables will be used for this group of input ports (GROUP1). For tagged values from PORT2 (port tag of 10) which forms the third Group (group tag 02 or GROUP2), the most significant two bits of the index value (I) is forced to "10" so that a fixed set of rows within the hash tables will be used for this group of input ports (GROUP2).

TABLE 4C below provides the combined data modifications to the hash values as set forth in TABLE 4A and TABLE 4B.

TABLE 4C

RESULTING DATA MODIFICATIONS

| | | | Modified Hash Value (N Bits) | | |
|---|---|---|---|---|---|
| Port | Group | Port Tag (T) (2 Bits) | Modified Memory Index Value (I) (4 bits) | Memory Key Data (K) (10 bits) | Modified Channel Data (M) (2 bits) |
| PORT0 | 00 | 00 | <u>00</u>00 | xxxxxxxxxx | 00 |
| | (Group0) | 00 | <u>00</u>01 | xxxxxxxxxx | 01 |
| | | ... | ... | ... | 00 |
| | | 00 | <u>00</u>11 | xxxxxxxxxx | 01 |
| PORT1 | 01 | 01 | <u>01</u>00 | xxxxxxxxxx | 10 |
| | (Group1) | 01 | <u>01</u>01 | xxxxxxxxxx | 11 |
| | | 01 | ... | ... | 10 |
| | | 01 | <u>01</u>11 | xxxxxxxxxx | 11 |
| PORT2 | 10 | 10 | <u>10</u>00 | xxxxxxxxxx | 00 |
| | (Group2) | 10 | <u>10</u>01 | xxxxxxxxxx | 01 |
| | | 10 | ... | ... | 10 |
| | | 10 | <u>10</u>11 | xxxxxxxxxx | 11 |

It is noted that TABLES 4A-C above provide simplified examples for three input ports and four deduplication engines where two input ports are spread across two deduplication engines, a third input port is spread across all four deduplication engines, and where the input ports are being deduplicated individually. As such, it is further noted that the number of input ports, the number of deduplication engines, and/or the mapping configurations can be more complicated. It is also noted that TABLES 4A-C provide example data values and are not intended to describe every possible combination of data values. Variations can be implemented, as desired, while still taking advantage of the port tagging techniques described herein.

Looking back now to FIG. 6A, once the M-bit channel data and/or other hash data (e.g., index value (I), key data (K), and/or other data within hash value) has been modified or left unmodified based upon the port mapping tables 512, the scheduler 302 then operates similar to the embodiment of FIG. 3. The M-bit channel data within the tagged channel data 506 determines which deduplication engine will receive the hash data. Once the determination is made, N–M bits of hash data is forwarded to the selected deduplication engine from among the available deduplication engines 230, 232, 234, and 236. In particular, hash data 221 is forwarded to deduplication engine (Engine0) 230; hash data 222 is forwarded to deduplication engine (Engine1) 232; hash data 223 is forwarded to deduplication engine (Engine2) 234; and hash data 224 is forwarded to deduplication engine (Engine3) 236. In addition, the channel selection data (M) used to make the forwarding determination, such as the modified/unmodified M-bit data values within the tagged channel data 506, are forwarded to a channel buffer 306. This selection data (e.g., modified/unmodified M-bit values) is then output as channel selection data 308 to arbiter 310. For the example above where four deduplication engines are used, 2 bits are used to select one of the four deduplication engines to receive the hash data associated with each input packet, and these 2-bit values are then provided from the channel buffer 306 as 2-bit channel selection data 308 to arbiter 310 where they are used to select one of the PASS/DROP buffers 320. As one example, the N-bit hash values can be generated as a 22-bit hash values; the port identifier tags can be 2 bits, and 2 bits can be used to make the deduplication engine selection. Other variations can also be implemented. For example, in the above TABLES, a 16-bit hash value was assumed to have been generated.

After the deduplication engines 230, 232, 234, and 236 have compared the hash data to previous data stored in hash tables within the data storage systems 252/254 and determined whether or not the hash data matches previously stored data, the deduplication engines 230, 232, 234, and 236 generate PASS/DROP instructions that are provide to pass/drop buffers 320. In particular, PASS/DROP instructions 226 are received from deduplication engine 230 and stored in PASS/DROP buffer 312 as a first PASS/DROP instruction channel. PASS/DROP instructions 227 are received from deduplication engine 232 and stored in PASS/DROP buffer 314 as a second PASS/DROP instruction channel. PASS/DROP instructions 228 are received from deduplication engine 234 and stored in PASS/DROP buffer 316 as a third PASS/DROP instruction channel. And PASS/DROP instructions 229 are received from deduplication engine 236 and stored in PASS/DROP buffer 318 as a fourth PASS/DROP instruction channel. The arbiter 310 receives the channel selection data 308 from the channel buffer 306, and the arbiter 310 uses each of these values (e.g., 2-bit values) to determine the PASS/DROP buffer from which to pull the next PASS/DROP instruction. Because each tagged channel value 506 stored in the channel buffer 306 identifies the deduplication engine to which hash data for a specific packet is sent, these tagged values 506 can also be used to select the PASS/DROP buffer from which to pull the next tagged PASS/DROP instruction. As such, the M-bit channel data within the tagged values 506 are output as channel selection data 308 to the arbiter 310. After pulling an instruction from buffers 312, 314, 316 and 318 based upon the channel selection data 308, the arbiter 310 adds the associated port tag (T) to the pass/drop instruction and outputs the aggregated/tagged PASS/DROP instructions 522 to the distributer 524, as described above.

Figure 7:
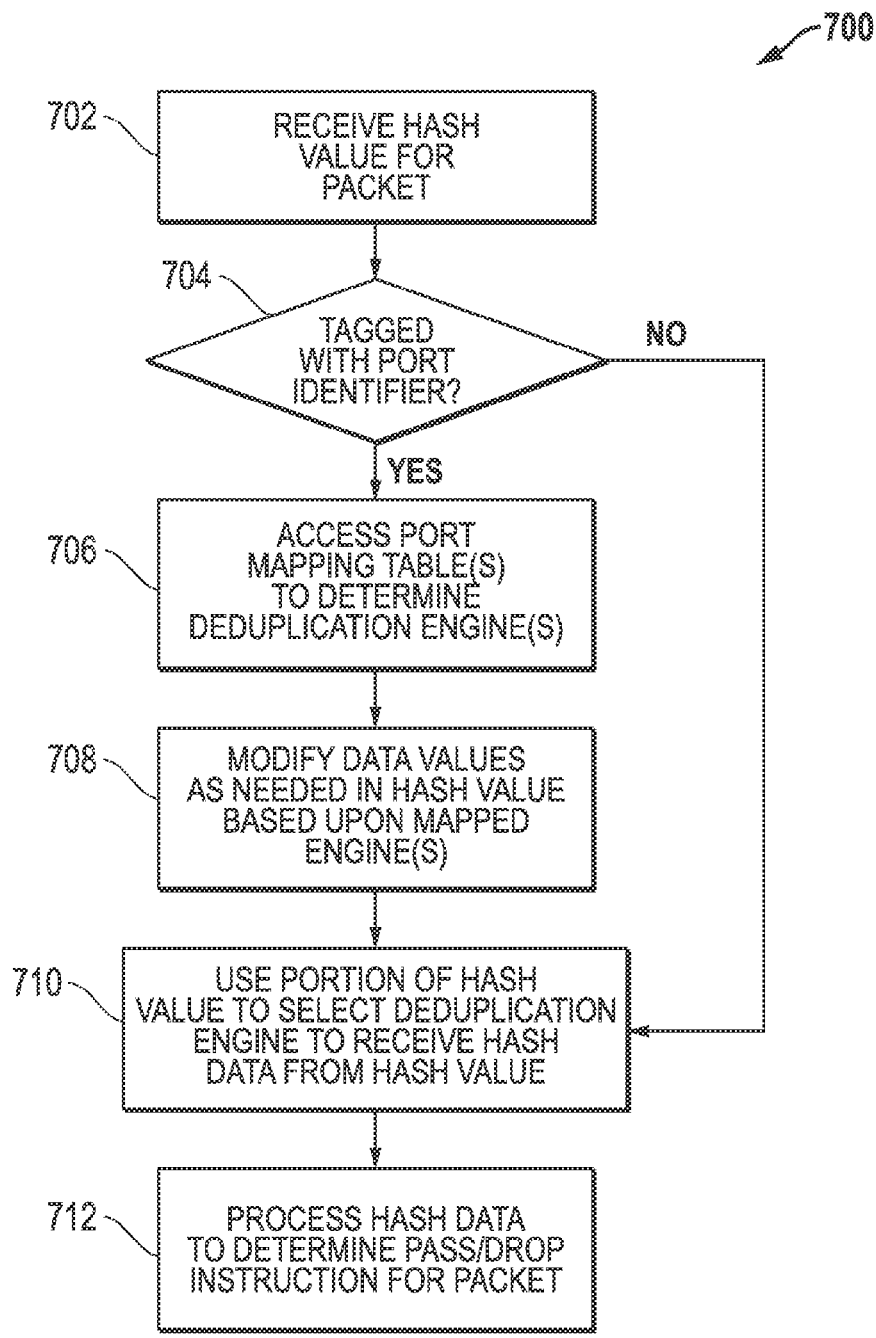
FIG. 7 is a process flow diagram of an embodiment for hash level load balancing using hash values to determine deduplication engines to receive hash data associated with the hash values.

FIG. 7 is a process flow diagram of an example embodiment 700 for using hash values to determine deduplication engines to receive hash data associated with the hash values. In block 702, a hash value is received for a packet. In block 704, a determination is made whether or not the hash value is tagged with an input port identifier. If "NO," then flow passes to block 710. If "YES," then flow passes to block 706 where one or more port mapping tables are accessed to determine one or more deduplication engines that have been mapped for the input port indicated by the input port identifier tag. In block 708, data values within the hash value for the packet are modified as needed based upon the mapped deduplication engine(s) for the input port. In block 710, a portion of the hash value is used to select the deduplication engine to receive hash data associated with the hash value for the packet. In block 712, the hash data is then processed to determine a PASS/DROP instruction for the packet. It is noted that different and/or additional process blocks can also be used while still taking advantage of the hash level load balancing techniques described herein for deduplication processing.

It is noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, programmable integrated circuitry can also be used, such as FPGAs (field programmable gate arrays), ASICs (application specific integrated circuits) and/or other programmable integrated circuitry. In addition, one or more processors running software or firmware could also be used, if desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, programmable circuitry (e.g., FPGAs) and/or processors to perform the processes, functions and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU, controller, microcontroller, processor, microprocessor, or other suitable processing circuitry.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for reducing duplicate packets in a stream of packets, comprising:
    receiving input packets from an input port;
    storing the input packets in a packet buffer;
    applying at least one hash algorithm to the input packets to generate hash values associated with the input packets;
    distributing hash data from the hash values among a plurality of deduplication engines based upon a portion of the hash values;
    processing the hash data with the plurality of deduplication engines to generate pass/drop instructions;
    combining the pass/drop instructions from the deduplication engines to form aggregated pass/drop instructions; and
    utilizing the aggregated pass/drop instructions to selectively pass or drop the input packets stored within the packet buffer such that pass instructions cause stored input packets to be included in an output packet stream and drop instructions cause stored input packets not to be included within the output packet stream;
    wherein an N-bit hash value is generated for each input packet, wherein M bits of each N-bit hash value are used to select a deduplication engine, and wherein N–M bits of each hash value are sent to the selected deduplication engine as the hash data.

2. The method of claim 1, wherein the processing comprises comparing the hash data to stored hash data associated with previously received packets, generating pass instructions if no matches are found, and generating drop instructions if matches are found.

3. The method of claim 1, further comprising receiving input packets from a plurality of input ports, storing the input packets in a plurality of packet buffers, and using hash generators to generate hash values associated with input packets from each of the plurality of input ports.

4. The method of claim 3, further comprising tagging each of the hash values with a port identifier tag to indicate the input port associated with the hash value.

5. The method of claim 4, further comprising using the hash value, the port identifier, or both the hash value and the port identifier to select a deduplication engine to receive the hash data.

6. The method of claim 5, further comprising configuring one or more port mapping tables to map input ports to one or more of the deduplication engines.

7. The method of claim 6, further comprising modifying one or more bits within the hash value based upon the one or more port mapping tables and using the one or more modified bits for the distributing.

8. The method of claim 6, wherein at least two input ports are mapped to one or more first deduplication engines, and wherein at least one additional input port is mapped to one or more second deduplication engines different from the one or more first deduplication engines.

9. A method for reducing duplicate packets in a stream of packets, comprising:
receiving input packets from an input port;
storing the input packets in a packet buffer;
applying at least one hash algorithm to the input packets to generate hash values associated with the input packets;
distributing hash data from the hash values among a plurality of deduplication engines based upon a portion of the hash values;
processing the hash data with the plurality of deduplication engines to generate pass/drop instructions;
combining the pass/drop instructions from the deduplication engines to form aggregated pass/drop instructions; and
utilizing the aggregated pass/drop instructions to selectively pass or drop the input packets stored within the packet buffer such that pass instructions cause stored input packets to be included in an output packet stream and drop instructions cause stored input packets not to be included within the output packet stream;
wherein the distributing comprises receiving the hash values from the hash generator and distributing the hash data among the deduplication engines based upon one or more channel selection bits selected from the hash values.

10. The method of claim 9, further comprising storing the one or more channel selection bits in a channel buffer, storing the pass/drop instructions from the deduplication engines in a plurality of pass/drop buffers, and using the channel selection bits to select pass/drop instructions from the pass/drop buffers to output as the aggregated pass/drop instructions.

11. A packet deduplication system for reducing duplicate packets, comprising:
a packet buffer configured to receive input packets from an input port and to store the input packets;
a hash generator configured to receive the input packets and to apply at least one hash algorithm to the input packets to generate hash values associated with the input packets;
a load balancer configured to receive the hash values from the hash generator and to distribute hash data from each hash value to a selected deduplication engine from among a plurality of deduplication engines based upon a portion of each hash value; and
a plurality of deduplication engines, each deduplication engine being configured to receive hash data from the load balancer and to output pass/drop instructions to the load balancer;
wherein the load balancer is further configured to receive the pass/drop instructions from each of the plurality of deduplication engines, to combine the pass/drop instructions, and to output aggregated pass/drop instructions; and
wherein the packet buffer is further configured to selectively pass or drop the stored input packets based upon the aggregated pass/drop instructions such that pass instructions indicate packets to be included in an output packet stream and drop instructions indicate packets not to be included within the output packet stream;
wherein the load balancer is configured to generate an N-bit hash value for each input packet, to use M bits of the N-bit hash value to determine the selected deduplication engine, and to send N–M bits of the hash value to the selected deduplication engine as the hash data.

12. The packet deduplication system of claim 11, wherein each deduplication engine is further configured to compare the hash data to stored hash data associated with previously received packets, to generate pass instructions if no matches are found, and to generate drop instructions if matches are found.

13. The packet deduplication system of claim 11, further comprising a plurality of memory controllers coupled to the plurality of deduplication engines and a plurality of data storage systems coupled to the plurality of memory controllers, and wherein the plurality of deduplication engines are configured to communicate with the plurality of memory controllers to store the hash data associated with previously received hash values in the plurality of data storage systems.

14. The packet deduplication system of claim 11, further comprising a configuration interface coupled to the load balancer and configured to allow configuration of one or more operational parameters for the load balancer.

15. The packet deduplication system of claim 11, where the load balancer comprises:
a scheduler configured to receive the hash values from the hash generator and to distribute the hash data among the deduplication engines based upon one or more channel selection bits selected from the hash values;
a channel buffer configured to store the one or more channel selection bits;
a plurality of pass/drop buffers, each pass/drop buffer being configured to store pass/drop instructions from one of the deduplication engines; and
an arbiter configured to use the one or more channel selection bits from the channel buffer to select pass/drop instructions from the pass/drop buffers to output as the aggregated pass/drop instructions.

16. The packet deduplication system of claim 11, wherein the packet buffer and the hash generator represent a first deduplication path for a first input port, and further comprising one or more additional deduplication paths for one or more additional input ports, each additional deduplication path also comprising a packet buffer and a hash generator.

17. The packet deduplication system of claim 16, further comprising a tag engine configured to receive the hash values from the deduplication paths and to add a port identifier as a tag to each of the hash values to indicate the input port associated with the hash value.

18. The packet deduplication system of claim 17, wherein the load balancer is configured to use the hash value, the port identifier, or both the hash value and the port identifier to select a deduplication engine to receive the hash data.

19. The packet deduplication system of claim 18, further comprising one or more port mapping tables associated with the load balancer that map each of the input ports to one or more of the deduplication engines.

20. The packet deduplication system of claim 19, wherein the load balancer is further configured to modify one or more bits within the hash value based upon the one or more port mapping tables and to use the one or more modified bits to distribute the hash data.

21. The packet deduplication system of claim 19, further comprising a configuration interface coupled to the load balancer and configured to allow configuration of the one or more port mapping tables.

22. The method of claim 19, wherein at least two input ports are mapped to one or more first deduplication engines, and wherein at least one additional input port is mapped to one or more second deduplication engines different from the one or more first deduplication engines.

* * * * *